(12) United States Patent
Bialogonski

(10) Patent No.: US 11,514,619 B2
(45) Date of Patent: Nov. 29, 2022

(54) METHOD, APPARATUS AND COMPUTER PROGRAM FOR GENERATING OR UPDATING A TEXTURE ATLAS

(71) Applicant: Samsung Electronics Co., Ltd., Suwon-si (KR)

(72) Inventor: Adam Bialogonski, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 17/142,679

(22) Filed: Jan. 6, 2021

(65) Prior Publication Data
US 2021/0295572 A1    Sep. 23, 2021

(30) Foreign Application Priority Data

Mar. 19, 2020    (GB) .................................... 2004018

(51) Int. Cl.
| | | |
|---|---|---|
| *G06T 11/00* | (2006.01) | |
| *G06F 3/04845* | (2022.01) | |
| *G06F 3/0485* | (2022.01) | |
| *G06T 11/40* | (2006.01) | |

(52) U.S. Cl.
CPC .......... *G06T 11/001* (2013.01); *G06F 3/0485* (2013.01); *G06F 3/04845* (2013.01); *G06T 11/40* (2013.01)

(58) Field of Classification Search
None
See application file for complete search history.

(56) References Cited

U.S. PATENT DOCUMENTS

| | | |
|---|---|---|
| 2002/0037113 A1 | 3/2002 | Shin et al. |
| 2003/0016229 A1 | 1/2003 | Dorbie et al. |
| 2010/0226593 A1 | 9/2010 | Gerhard et al. |
| 2012/0328191 A1 | 12/2012 | Fenney |

(Continued)

FOREIGN PATENT DOCUMENTS

| | | |
|---|---|---|
| EP | 1 162 829 A2 | 12/2001 |
| JP | 2013-206094 A | 10/2013 |

(Continued)

OTHER PUBLICATIONS

Great Britain Search Report dated Sep. 2, 2020; Great Britain Appln. No. GB2004018.4.

(Continued)

*Primary Examiner* — Nurun Flora
(74) *Attorney, Agent, or Firm* — Jefferson IP Law, LLP

(57) ABSTRACT

A method, apparatus and computer program for generating or updating a texture atlas are provided. The texture atlas is generated or updated by obtaining a first texture to be stored in the texture atlas, dividing the first texture into a plurality of parts, storing the plurality of parts in a respective plurality of spaces in the texture atlas, such that the plurality of parts of the first texture may be separated by parts of other textures in the texture atlas, and storing texture reconstruction information defining how to combine the plurality of parts to render the first texture. By dividing the first texture into the plurality of parts, it is possible to store the texture in the texture atlas even in cases where the atlas does not have an available space of the same dimensions as the undivided texture.

19 Claims, 11 Drawing Sheets

(56) References Cited

U.S. PATENT DOCUMENTS

| | | | |
|---|---|---|---|
| 2013/0016112 A1 | 1/2013 | Burley et al. | |
| 2014/0333621 A1 | 11/2014 | Hillesland et al. | |
| 2015/0348280 A1* | 12/2015 | Oriol | G06T 1/60 |
| | | | 345/582 |
| 2016/0078658 A1 | 3/2016 | Santos | |
| 2017/0200301 A1 | 7/2017 | Boisse et al. | |
| 2017/0358109 A1 | 12/2017 | Troiano et al. | |
| 2019/0026925 A1* | 1/2019 | Sakurai | G06T 11/001 |
| 2019/0180495 A1 | 6/2019 | Ceylan et al. | |
| 2019/0266696 A1* | 8/2019 | Wahrenberg | G06T 15/04 |

FOREIGN PATENT DOCUMENTS

| | | |
|---|---|---|
| JP | 2017-072977 A | 4/2017 |
| KR | 10-2012-0063311 A | 6/2012 |

OTHER PUBLICATIONS

International Search Report dated Apr. 7, 2021; International Appln. No. PCT/KR2020/018794.

* cited by examiner

METHOD, APPARATUS AND COMPUTER PROGRAM FOR GENERATING OR UPDATING A TEXTURE ATLAS

CROSS-REFERENCE TO RELATED APPLICATION(S)

This application is based on and claims priority under 35 U.S.C. § 119(a) of a United Kingdom patent application number 2004018.4, filed on Mar. 19, 2020, in the United Kingdom Intellectual Property Office, the disclosure of which is incorporated by reference herein in its entirety.

BACKGROUND

1. Field

The disclosure relates to texture atlases. More particularly, the disclosure relates to a method, apparatus and computer program for generating or updating a texture atlas.

2. Description of Related Art

In computer graphics, when multiple images are stored separately in memory, the need to load, decode and fetch each image individually can result in a performance impact. To improve performance, a plurality of images is commonly stored together in a texture atlas. Rather than storing each image as a separate object, in a texture atlas the images are packed as one texture, and texture coordinates are used to access the correct texels during rendering. This approach reduces the cost of binding an individual texture. In applications such as video games, texture atlases can be generated offline since the images are known in advance, and can be packed efficiently in one or more texture atlases by taking into account how and when they are going to be used. However, further improvements to texture atlases that could increase performance would still be desirable.

The disclosure is made in this context.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for generating or updating a texture atlas.

Additional aspects will be set forth in part in the description which follows and, in part, will be apparent from the description, or may be learned by practice of the presented embodiments.

In accordance with an aspect of the disclosure, a method of generating or updating a texture atlas is provided. The method includes obtaining a first texture to be stored in a texture atlas, dividing the first texture into a plurality of parts, storing the plurality of parts in a respective plurality of spaces in the texture atlas, such that the plurality of parts of the first texture may be separated by parts of other textures in the texture atlas, and storing texture reconstruction information defining how to combine the plurality of parts to render the first texture.

In some embodiments according to the first aspect, the dividing of the first texture into the plurality of parts comprises dividing the first texture into a plurality of parts of equal size.

In some embodiments according to the first aspect, each of the plurality of parts of equal size has a width of n texels and a height of m texels, and based on a width or a height of the first texture being a non-integer multiple of n or m, respectively, such that the first texture cannot be divided equally into the plurality of parts of equal size without leaving one or more remainder parts of smaller size than n×m, the method further comprises using padding to increase a size of each of the one or more remainder parts to n×m texels, so as to obtain the plurality of parts of equal size including the one or more padded remainder parts.

In some embodiments according to the first aspect, the method further comprises copying the plurality of parts of equal size including the one or more padded remainder parts into a memory block by using a linear memory copy operation.

In some embodiments according to the first aspect, the first texture and/or the other textures in the texture atlas include textures of different sizes, and the plurality of parts of the first texture and the parts of the other textures are all of equal size.

In some embodiments according to the first aspect, the texture atlas comprises an existing texture atlas already stored in memory before the first texture is obtained, and storing the plurality of parts comprises updating the existing texture atlas by identifying a plurality of available spaces in the texture atlas, and storing each of the plurality of parts in a respective one of the identified available spaces.

In some embodiments according to the first aspect, the plurality of identified available spaces include one or more spaces occupied by a part of a texture that is no longer required, such that the part is replaced by a respective part of the first texture based on the plurality of parts of the first texture being stored in the texture atlas.

In some embodiments according to the first aspect, the first texture comprises a texture for rendering a graphical user interface (GUI).

In some embodiments according to the first aspect, storing the plurality of parts of the first texture comprises determining a drawing order in which the first texture and one or more other textures will be drawn when rendering the GUI, and arranging the plurality of parts of the first texture and parts of the one or more other textures in dependence on the determined drawing order.

In some embodiments according to the first aspect, the texture atlas comprises a plurality of pages, and the plurality of parts of the first texture and parts of the one or more other textures are arranged among the plurality of pages in dependence on the determined drawing order such that parts of textures which will be drawn at similar times are stored on the same page of the texture atlas, to reduce a number of drawing calls required when rendering the GUI.

In some embodiments according to the first aspect, the method further comprises determining that the drawing order has changed since the plurality of parts of the first texture and parts of the one or more other textures were arranged in the texture atlas, and re-arranging the plurality of parts of the first texture and parts of the one or more other textures in dependence on the changed drawing order.

In some embodiments according to the first aspect, the GUI screen comprises a scrollable GUI screen such that a first off-screen texture closer to an edge of the screen in a scrolling direction will be drawn before a second off-screen texture further from said edge of the screen, and determining the drawing order comprises assigning the first off-screen texture a higher position in the drawing order than the second off-screen texture.

In some embodiments according to the first aspect, storing the plurality of parts in the texture atlas comprises comparing the plurality of parts to each other to identify a plurality of repeated parts among the plurality of parts, the repeated parts comprising parts of the first texture which contain similar or identical image content to each other, and based on a plurality of repeated parts being identified, storing only one of the repeated parts in the texture atlas to reduce the space occupied by the first texture in the texture atlas.

In some embodiments according to the first aspect, the method further comprises compressing the texture atlas after storing the plurality of parts of the first texture, wherein the plurality of parts of the first texture and the parts of other textures are arranged so as to increase an efficiency of the compression.

In some embodiments according to the first aspect, the method further comprises arranging the plurality of parts of the first texture and the parts of the other textures to increase the efficiency of the compression comprises grouping parts with similar texel values together in the texture atlas.

In accordance with another aspect of the disclosure, a non-transitory computer-readable recording medium having recorded thereon at least one program comprising instructions, which, when executed, perform a method according to the first aspect, is provided.

In accordance with another aspect of the disclosure, an apparatus is provided. The apparatus includes one or more processors and a memory coupled to the one or more processors. The memory is configured to store computer program instructions, which, when executed by the one or more processors, cause the apparatus to obtain a first texture to be stored in a texture atlas, divide the first texture into a plurality of parts, store the plurality of parts in a respective plurality of spaces in the texture atlas, such that the plurality of parts of the first texture may be separated by parts of other textures in the texture atlas, and store texture reconstruction information defining how to combine the plurality of parts to render the first texture.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A method of generating or updating a texture atlas will be described with reference to FIGS. 1 and 2, according to an embodiment of the disclosure.

Figure 1:
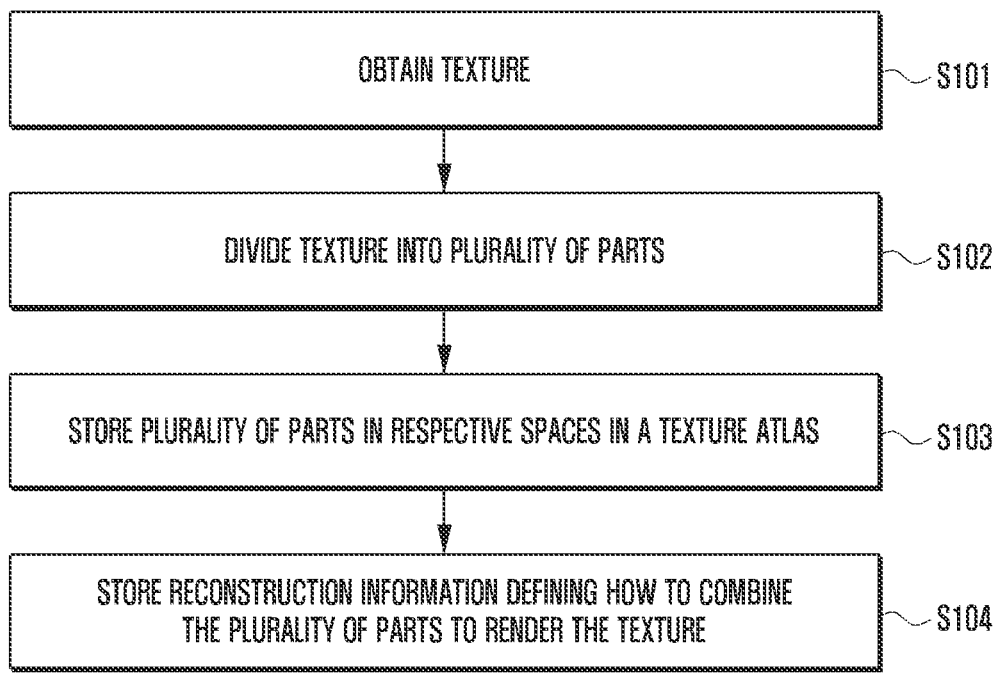
FIG. 1 is a flowchart illustrating a method of generating or updating a texture atlas, according to an embodiment of the disclosure.

FIG. 1 is a flowchart illustrating a method of generating or updating a texture atlas, according to an embodiment of the disclosure.

Figure 2:
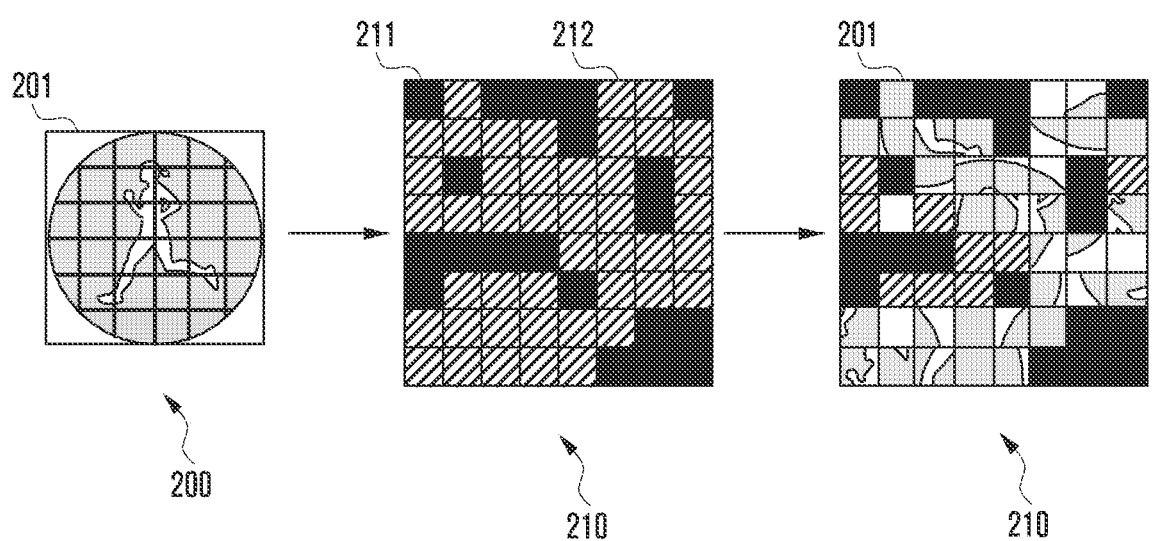
FIG. 2 illustrates a process of storing a texture in a texture atlas, according to an embodiment of the disclosure.

FIG. 2 illustrates a process of storing a texture in a texture atlas, according to an embodiment of the disclosure.

Referring to FIG. 1, in operation S101 a texture 200 to be stored in a texture atlas is obtained. For example, in operation S101 the texture 200 may be retrieved from non-volatile local storage or downloaded from a server. For example, the texture 200 may comprise a texture for rendering a graphical user interface (GUI), although in other embodiments the texture 200 may be used for a different purpose. Then, in operation S102 the texture 200 is divided into a plurality of parts 201. In the present embodiment the texture 200 is divided into parts 201 of equal size, however in other embodiments a texture may be divided into parts of different sizes.

Next, in operation S103 the plurality of parts 201 of the texture 200 is stored in a respective plurality of spaces 212 in the texture atlas 210.

Referring to FIG. 2, the solid black squares 211 in the texture atlas 210 denote spaces in the texture atlas 210 that are already occupied by other textures or parts of textures, whilst the shaded squares 212 denote spaces that are available for storing the parts 201 of the texture 200 obtained in operation S101. As shown in the right-hand diagram in FIG. 2, the plurality of parts 201 of the texture 200 can be stored in the atlas 210 in such a way that the parts 201 of the texture 200 may be separated by parts of other textures in the texture atlas 210.

In this way, the parts 201 of the texture 200 can be stored in spaces 212 within the atlas 210 that are themselves too small to hold the entire undivided texture 200 in its original size. By dividing the texture 200 into a plurality of parts 201, it can be possible to store the texture 200 in the texture atlas 210 even in cases where the atlas 210 does not have an available space of the same dimensions as the undivided texture 200. This approach can allow the texture 200 to be stored in the texture atlas 210 provided that the sum of the area of the available spaces 212 is greater than or equal to the area of the original undivided texture 200.

Furthermore, dividing input textures into a plurality of parts can make more efficient use of the available space in a texture atlas, by storing texture information in spaces that would otherwise be too small to hold any of the input textures. By comparison, in methods of the related art which store whole textures in an atlas, if there is no space available with the same dimensions as the whole texture then the texture atlas would need to be expanded to accommodate the texture, for example by adding a new page to the texture atlas.

In operation S104, texture reconstruction information is generated and stored in memory. The texture reconstruction information comprises geometry information that defines how to combine the plurality of parts 201 to render the texture 200. When rendering the texture 200 from the texture atlas 210, the texture reconstruction information can be read from memory and used to draw the texture 200 in its original undivided form, by identifying where to place each part 201 of the texture so as to form the original image.

In the present embodiment, the texture 200 is divided into a plurality of parts 201 of predefined size. In some embodiments, the size of the parts 201 into which the texture 200 is divided may be determined by taking into account the computational cost associated with the texture reconstruction information that will be required to reconstruct the original texture 200. As the size of each part 201 is reduced the number of parts 201 increases, with the result that the texture reconstruction information may occupy more space in memory, and reconstructing the texture from the plurality of parts 201 during rendering may consume more processing resources.

In one embodiment, an algorithm may analyze the input texture 200 to determine whether to increase or decrease the size of the parts 201. For example, the algorithm may initially start by dividing the texture into larger parts, and then try reducing the part size in increments to see if more efficient packing in the atlas can be achieved. The algorithm may terminate the process if the size of the texture reconstruction information increases beyond a certain limit. In other words, the algorithm may choose the part size that provides the most efficient packing within the texture atlas while keeping the texture reconstruction information within acceptable limits.

Figure 3:
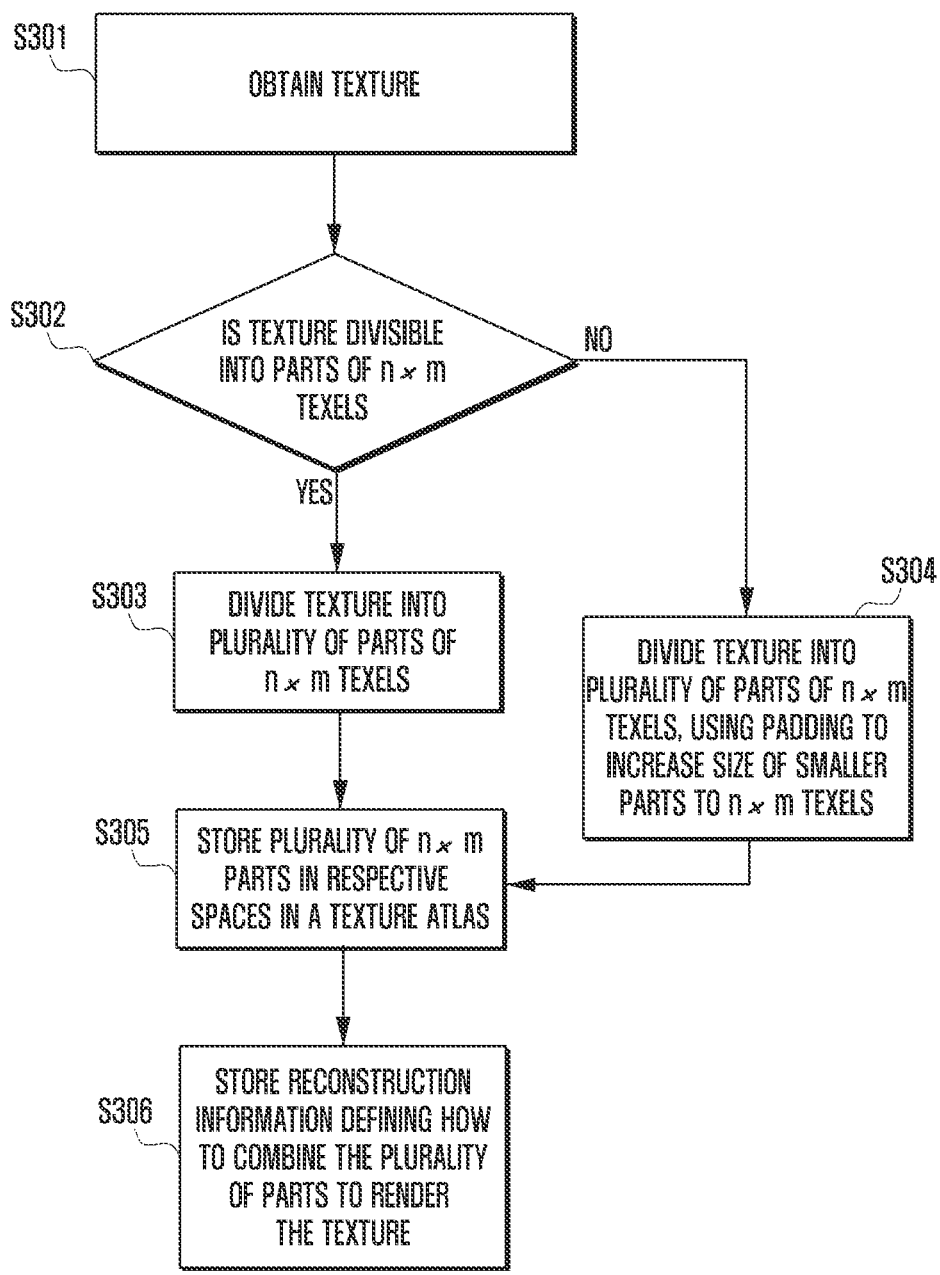
FIG. 3 is a flowchart illustrating a method of generating or updating a texture atlas in a situation where a texture cannot be divided equally into parts of equal size, according to an embodiment of the disclosure.

FIG. 3 is a flowchart illustrating a method of generating or updating a texture atlas in a situation where a texture cannot be divided equally into parts of equal size, according to an embodiment of the disclosure.

Figure 4:
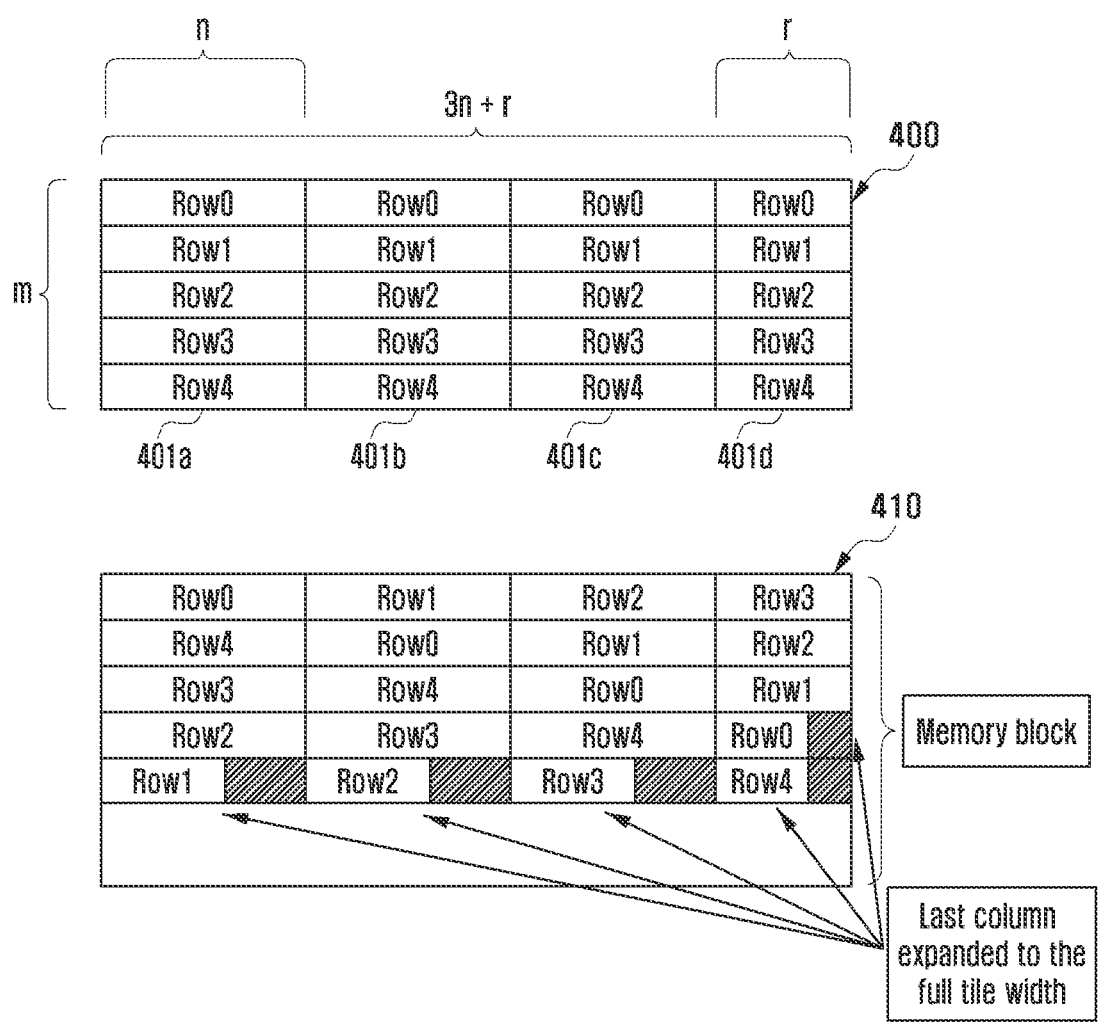
FIG. 4 illustrates a process of padding remainder parts of a texture, according to an embodiment of the disclosure.

FIG. 4 illustrates a process of padding remainder parts of a texture, according to an embodiment of the disclosure.

Referring to FIGS. 3 and 4, a method of generating or updating a texture atlas in a situation where a texture cannot be divided equally into parts of equal size is illustrated, according to an embodiment of the disclosure. In operation S301, which is equivalent to operation S101 of the method shown in FIG. 1, a texture 400 to be stored in a texture atlas is obtained. Then, in operation S302 it is checked whether the texture 400 can be equally divided into a plurality of parts of size n×m texels (texture elements), where n is the width of each part and m is the height of each part. In the present embodiment, by way of an example the texture 400 has a width of (3n+r) texels and a height of m texels, where r is not equal to an integer multiple of n, and therefore the width of the texture 400 cannot be divided equally into a plurality of parts of equal width n.

If the width and height of the texture are both integer multiples of n and m respectively, then the process proceeds to operation S303 and the texture is divided into the plurality of parts of size n×m texels. In this respect, operation S303 can be performed in a similar way to operation S102 of the method shown in FIG. 1, as described above.

On the other hand, if the width or height of the texture is a non-integer multiple of n or m respectively, as is the case for the texture 400 illustrated in FIG. 4, then it is determined in operation S302 that the texture 400 cannot be divided equally into the plurality of parts of equal size without leaving one or more remainder parts of smaller size than n×m. In this case, the process proceeds to operation S304, in which the texture 400 is divided into a plurality of parts 401a, 401b, 401c of equal size n×m, plus a remainder part 401d of smaller size than n×m. In the embodiment shown in FIG. 4 there is one remainder part 401d of size r×m, but in other embodiments there could be a plurality of remainder parts (i.e., if the height of the texture 400 is larger than m).

Also, in the embodiment shown in FIG. 4 each tile comprises five rows of texels, numbered from row 0 through to row 4. Therefore m=5 texels in the present embodiment, although in other embodiments a different value of m may be used. In operation S304, padding is used to increase a width of each row of the one or more remainder parts 401d to n texels. Specifically, padding of (n−r) texels is added to each row of the remainder part 401d.

Using padding in this way allows all rows of the plurality of parts 401a, 401b, 401c, 401d of the texture 400 to be written into a block of Graphics Processing Unit (GPU) memory in an efficient manner using a single linear memory copy operation, without the need for any checks. This is made possible because the padded rows of the remainder parts 401d are the same width (n texels) as the rows of the other parts 401a, 401b, 401c of the texture 400, and therefore all rows of all parts 401a, 401b, 401c, 401d of the texture 400 occupy the same amount of memory. This approach may be particularly advantageous when using application programming interfaces (APIs) that prefer to be given whole data as a linear chunk of memory, for example the Graphics Library (GL) API.

Next, in operation S305 the plurality of parts 401a, 401b, 401c, 401d are written into a block of memory 410 by writing all rows of the first part 401a in sequence, from row 0 to row 4, followed by all rows of the second part 401b, then all rows of the third part 401c, and finally the padded rows of the remainder part 401d. This allows each part 401a, 401b, 401c, 401d to be loaded into a Graphics Processing Unit (GPU) in turn by simply reading data out of the memory block 410 in linear fashion, since all rows of the first part 401a will be read before reaching the first row of the second part 401b, and so on.

Then, in operation S306 texture reconstruction information is generated and stored, as described above. When padding has been used in operation S304, the texture reconstruction information that is stored in operation S306 can include an instruction to remove the padding from rows of the remainder part 401d when rendering the texture 400, so that the texture 400 is rendered with the correct size.

Figure 5:
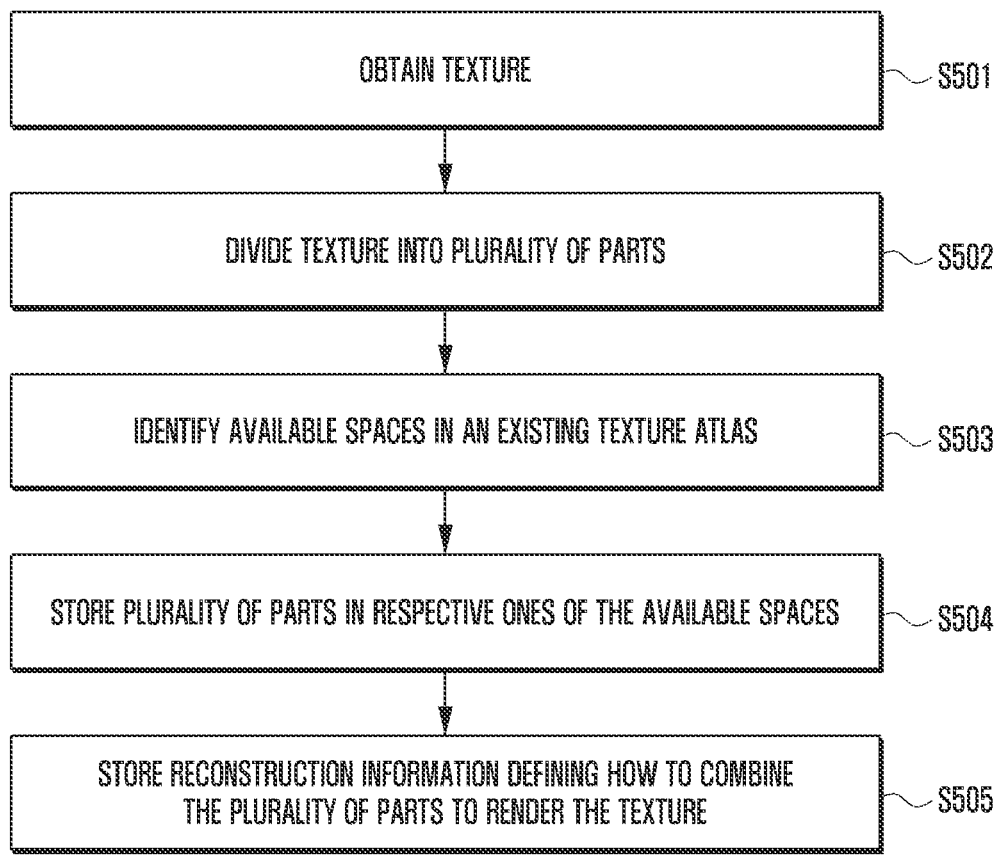
FIG. 5 is a flowchart illustrating a method of adding a texture to an existing texture atlas, according to an embodiment of the disclosure.

FIG. 5 is a flowchart illustrating a method of adding a texture to an existing texture atlas, according to an embodiment of the disclosure.

Figure 6:
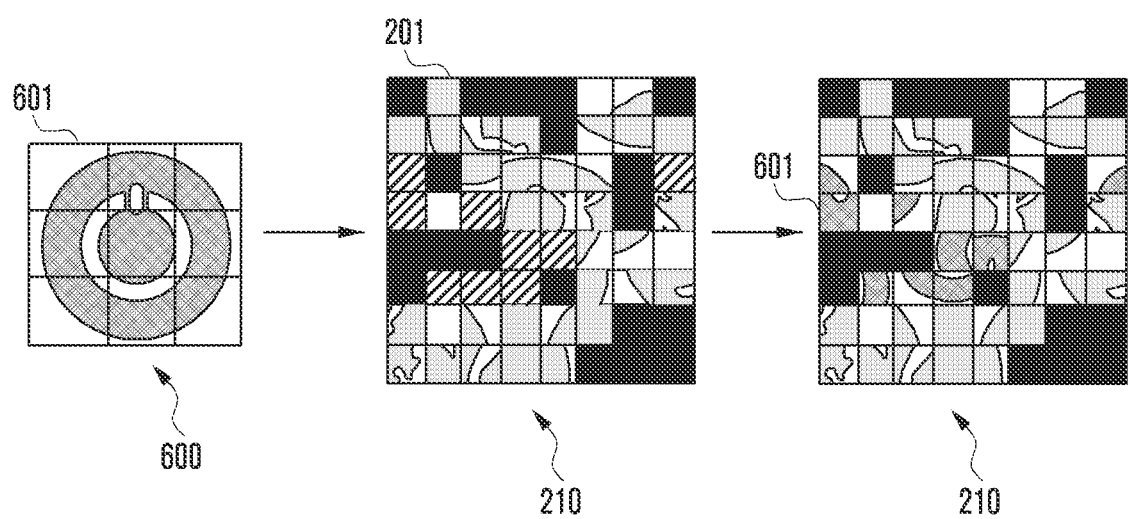
FIG. 6 illustrates a process of adding a texture to an existing texture atlas, according to an embodiment of the disclosure.

FIG. 6 illustrates a process of adding a texture to an existing texture atlas, according to an embodiment of the disclosure.

Referring to FIGS. 5 and 6, a flowchart illustrating a method of adding a texture to an existing texture atlas is illustrated, according to an embodiment of the disclosure. FIG. 6 illustrates an example of a new texture being added to the texture atlas 210 from the right-hand diagram in FIG. 2. In the present embodiment the new texture 600 is a different size to the texture 200 that is already stored in the texture atlas 210. In another embodiment, the texture being added to the texture atlas may be the same size as a texture that is already stored in the texture atlas.

In operations S501 and S502, a texture 600 is obtained and divided into a plurality of parts 601. Operations S501 and S502 are equivalent to operations S101 and S102 in FIG. 1, and a detailed explanation will not be repeated herein. In the present embodiment the texture 600 is divided into parts of the same size as the plurality of parts 201 of the texture 200 in FIG. 2. By using a standard sized part for all textures stored in the texture atlas 210, the process of adding and removing parts of different textures to/from the texture atlas 210 can be simplified, since a part of a texture that is no longer required can simply be replaced by a similarly-sized part of a new texture. However, in other embodiments the texture that is obtained in operation S501 could be divided into parts of a different size to the parts of one or more textures that are already stored in the texture atlas 210.

Next, in operation S503 a plurality of available spaces is identified within the existing texture atlas 210. Depending on the situation, one or more of the available spaces may be empty spaces in the texture atlas that do not currently contain any texture information, and/or one or more of the available spaces may be spaces that contain texture information for a texture that is no longer needed, and which can therefore be replaced with the texture information for part 601 of the new texture 600.

Then, in operation S504 the plurality of parts 601 are stored in the available spaces within the texture atlas 210. Depending on the embodiment, operations S503 and S504 may be performed sequentially or in parallel. For example, in a parallel implementation, the algorithm may store part 601 of the texture 600 in the texture atlas 210 as and when the next available space is found, as opposed to waiting until a sufficient number of available spaces to store all parts 601 of the texture 600 have been identified.

In some embodiments, if there is insufficient space on the current page of the texture atlas 210 to store all parts 601 of the texture 600, in operation S504 parts 601 of the texture 600 can be stored on the current page until no more spaces are available, at which point any leftover parts 601 of the texture 600 can be stored on one or more other pages of the texture atlas 210. In this situation, in which parts 601 of the same texture 600 are stored across multiple pages of a texture atlas 210, the texture 600 may be reconstructed during rendering by using a shader that is capable of sampling a plurality of pages of a texture atlas with a single draw call, for example by using a texture array.

Then, in operation S505 texture reconstruction information is generated and stored in memory. Operation S505 is equivalent to operation S104 in FIG. 1, and a detailed explanation will not be repeated herein.

In some embodiments, the texture atlas 210 may be compressed after adding the parts 601 of the new texture 600 to the texture atlas 210. In one such embodiment, the plurality of parts 601 of the newly-added texture 600 and parts 201 of one or more other textures 200 already present in the texture atlas 210 may be arranged so as to increase an efficiency of the compression. For example, the parts 601 of the newly-added texture 600 and the parts 201 of the previous textures 200 may be arranged so as to group parts 201, 601 with similar texel values (e.g., color values) together in the texture atlas 210, to enable more efficient compression of the texture atlas 210.

Figure 7:
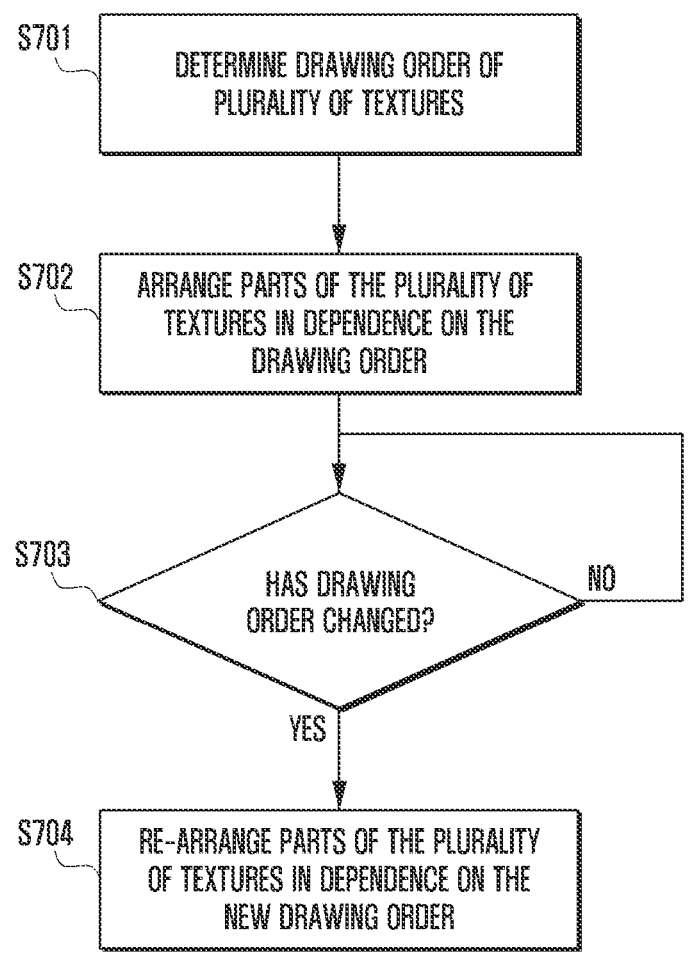
FIG. 7 is a flowchart illustrating a method of generating or updating a texture atlas in dependence on a drawing order of a plurality of textures, according to an embodiment of the disclosure.

FIG. 7 is a flowchart illustrating a method of generating or updating a texture atlas in dependence on a drawing order of a plurality of textures, according to an embodiment of the disclosure.

Figure 8:
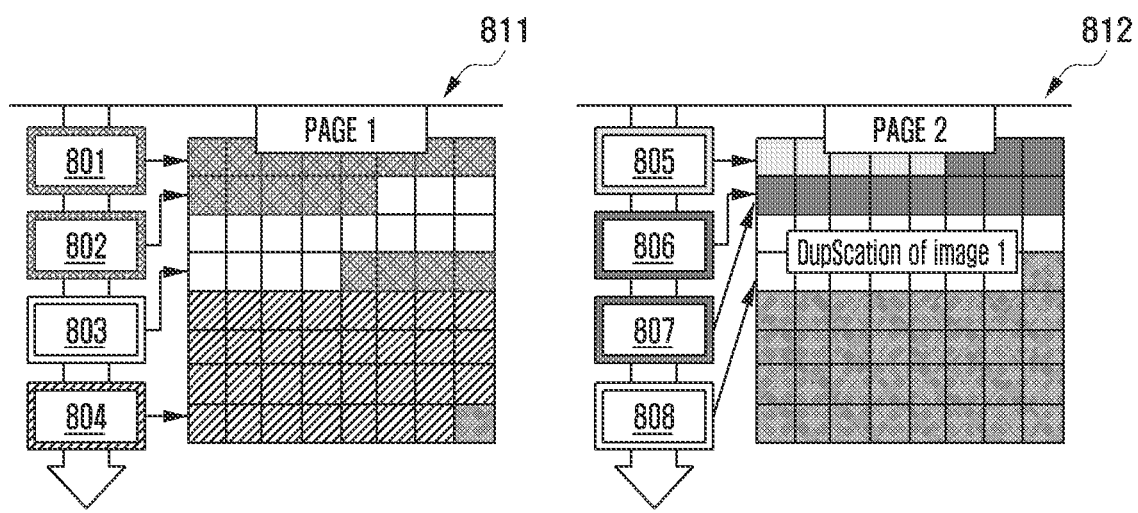
FIG. 8 illustrates a texture atlas comprising a plurality of pages in which textures are arranged according to a drawing order, according to an embodiment of the disclosure.

FIG. 8 illustrates a texture atlas comprising a plurality of pages in which textures are arranged according to a drawing order, according to an embodiment of the disclosure.

Referring to FIGS. 7 and 8, a method of generating or updating a texture atlas in dependence on a drawing order of a plurality of textures is illustrated, according to an embodiment of the disclosure. A method such as the one shown in FIG. 7 can be used when storing parts of a texture in a texture atlas, for example in operation S103 of FIG. 1, operation S305 of FIG. 3, or S504 of FIG. 5.

First, in operation S701 a drawing order is determined in which the texture and one or more other textures in the texture atlas will be drawn when rendering the GUI. For example, in an embodiment in which the textures are to be rendered in a GUI comprising a scrollable GUI screen, such that a first off-screen texture closer to an edge of the screen in a scrolling direction will be drawn earlier than a second off-screen texture further from said edge of the screen, the first off-screen texture may be assigned a higher position in the drawing order than the second off-screen texture.

In operation S702, the plurality of parts of the textures is arranged within the texture atlas in dependence on the determined drawing order. In the embodiment shown in FIG. 8, the parts of eight textures 801, 802, 803, 804, 805, 806, 807, 808 are arranged across two pages 811, 812 of a texture atlas in dependence on the order in which they will be drawn. In this embodiment, the first texture 801 is drawn before the second texture 802, the second texture 802 is drawn before the third texture 803, the third texture 803 is drawn before the fourth texture 804, the fourth texture 804 is drawn before the fifth texture 805, the fifth texture 805 is drawn before the sixth texture 806, the sixth texture 806 is drawn before the seventh texture 807, and the seventh texture 807 is drawn before the eighth texture 808.

Also, in embodiments in which the texture atlas comprises a plurality of pages, the plurality of parts of the textures can be arranged among the plurality of pages such that parts of textures which will be drawn at similar times are stored on the same page of the texture atlas. This approach reduces the number of drawing calls that are required when rendering the GUI. For example, in the embodiment shown in FIG. 8 the eighth texture 808 is a duplicate of the third texture 803. However, rather than re-loading the first page 811 after rendering the seventh texture 807 in order to re-render the third texture 803, in this embodiment the third texture 803 is copied on the second page 812 of the texture atlas as the eighth texture 808, so as to avoid having to make another page call after rendering the seventh texture 807. This approach may be particularly advantageous when geometry batching is used, since paging may require changing the texture binding many times, and can break batched draw calls as a result.

At some point after first arranging the parts of the textures in the texture atlas, in operation S703 it is checked whether the drawing order has changed in comparison to the order that was determined in operation S701. If it is determined that the drawing order has changed, then in operation S704 the plurality of parts of the textures are rearranged in dependence on the changed drawing order. By rearranging the textures in this way, the layout of the texture atlas can be optimized for the new drawing order.

Figure 9:
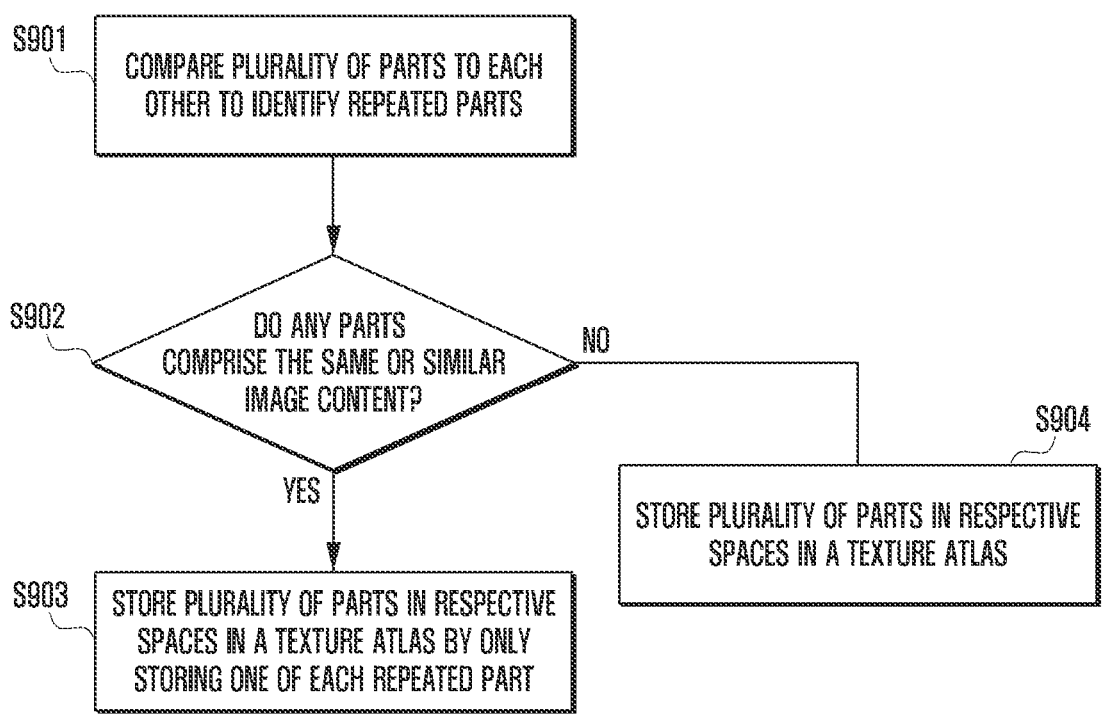
FIG. 9 is a flowchart illustrating a method of reducing the space occupied by a texture in a texture atlas by searching for repeated parts in the texture, according to an embodiment of the disclosure.

FIG. 9 is a flowchart illustrating a method of reducing the space occupied by a texture in a texture atlas by searching for repeated parts in the texture, according to an embodiment of the disclosure.

Referring to FIG. 9, a method of reducing the space occupied by a texture in a texture atlas by searching for repeated parts in the texture is illustrated, according to an embodiment of the disclosure. A method such as the one shown in FIG. 9 can be used when storing parts of textures in a texture atlas in any embodiments of the disclosure, for example in operation S103 of FIG. 1, operation S305 of FIG. 3, or operation S504 of FIG. 5.

First, in operation S901 the plurality of parts of a texture is compared to each other so as to identify whether there are any repeated parts among the plurality of parts. Here, the term 'repeated parts' may refer to parts of the texture which contain identical image content to each other, or may refer to parts of the texture which contain similar image content to each other. In other words, depending on the embodiment two parts of the texture may have to be identical to be considered 'repeated parts', or may only need to be similar to each other, for a given degree of similarity. For example, two parts which are both fully transparent or are both filled with a single color could be considered as repeated parts.

In operation S902, if any repeated parts are identified then in operation S903 the texture is stored in the texture atlas by only storing one copy of each repeated part in the texture atlas, as opposed to storing multiple copies of the same repeated part. In this way, the total space occupied by the texture can be reduced, by taking advantage of redundancies within the texture information. On the other hand, if there are no repeated parts then in operation S904 all parts of the texture are stored in the texture atlas.

Figure 10:
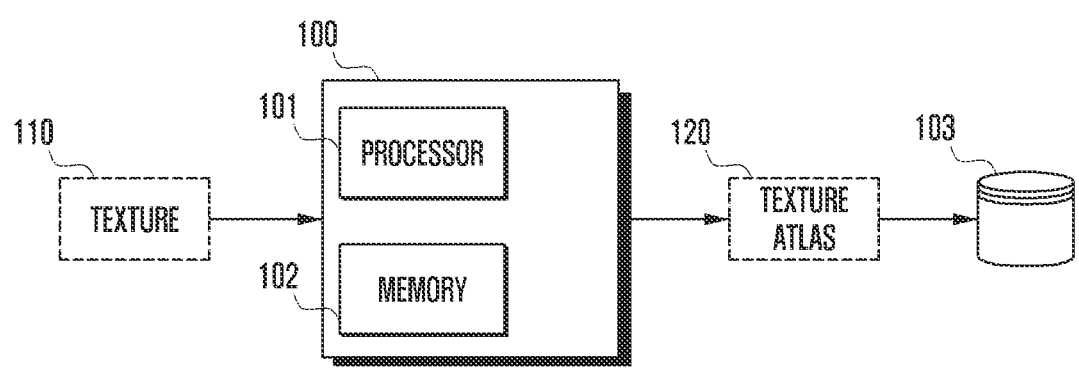
FIG. 10 illustrates an apparatus for generating or updating a texture atlas, according to an embodiment of the disclosure.

FIG. 10 illustrates an apparatus for generating or updating a texture atlas, according to an embodiment of the disclosure.

Referring to FIG. 10, an apparatus for generating or updating a texture atlas is illustrated, according to an embodiment of the disclosure. The apparatus 100 comprises one or more processors 101 and first memory 102. The first memory 102 can comprise any suitable form of non-transitory computer readable storage medium, and is adapted to store computer program instructions which, when executed by the one or more processors 101, cause the apparatus 100 to perform any of the methods disclosed herein.

For example, in one embodiment the first memory 102 may store computer program instructions which cause the apparatus 100 to perform a method as shown in FIG. 1. In this embodiment, when executed by the one or more processors 101 the computer program instructions cause the apparatus 100 to obtain a first texture 110 to be stored in a texture atlas 120, divide the first texture 110 into a plurality of parts, store the plurality of parts in a respective plurality of spaces in the texture atlas 120, such that the plurality of parts of the first texture 110 may be separated by parts of other textures in the texture atlas 120, and store texture reconstruction information defining how to combine the plurality of parts to render the first texture 110. The texture atlas 120 and the texture reconstruction information can be stored in the first memory 102 or in remote storage 103, depending on the embodiment.

Figure 11:
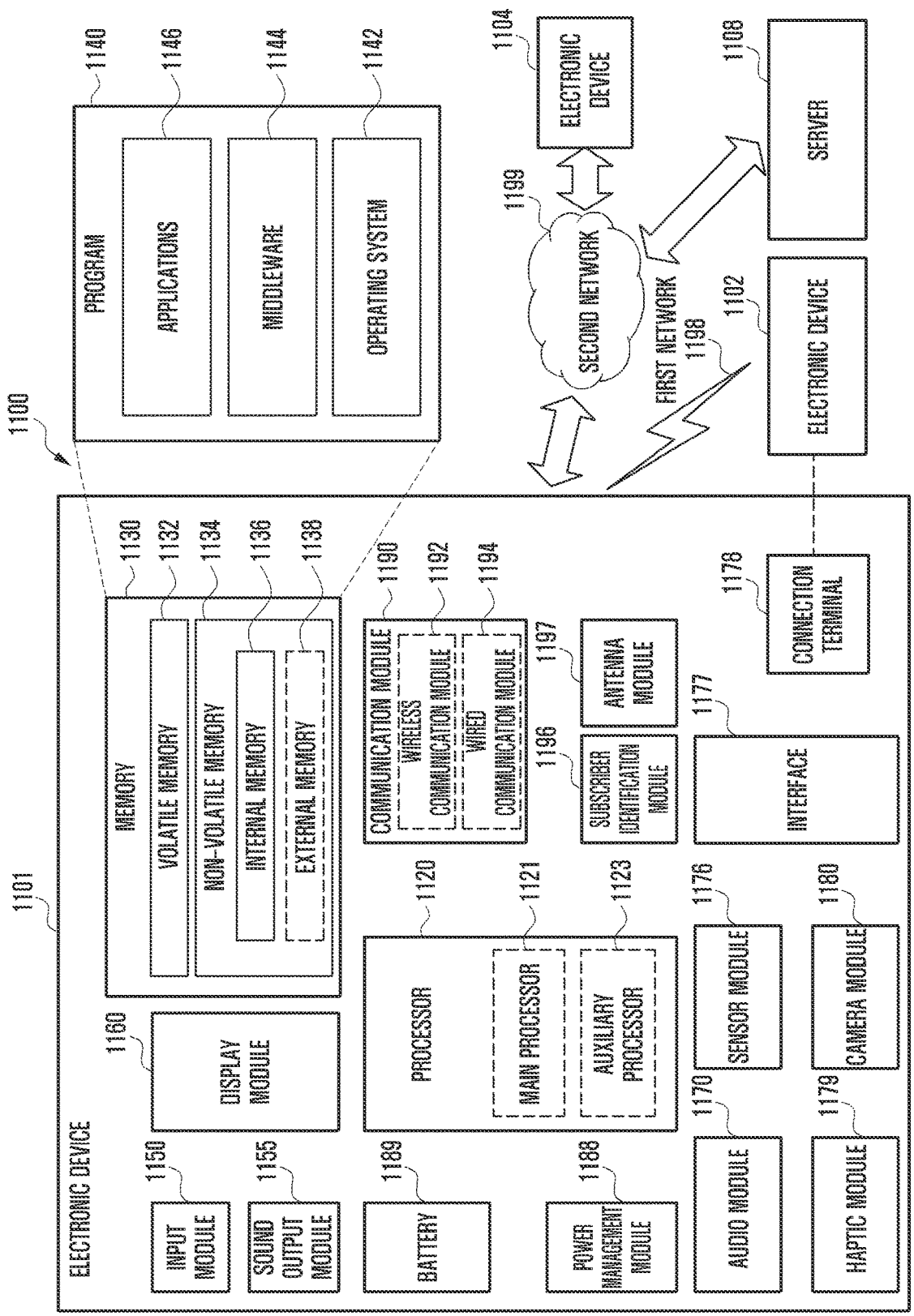
FIG. 11 is a block diagram illustrating an electronic device in a network environment according to an embodiment of the disclosure.

FIG. 11 is a block diagram illustrating an electronic device 1101 in a network environment 1100 according to various embodiments. Referring to FIG. 11, the electronic device 1101 (e.g., the apparatus 100) in the network environment 1100 may communicate with an electronic device 1102 via a first network 1198 (e.g., a short-range wireless communication network), or at least one of an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments, at least one of the components (e.g., the connecting terminal 1178) may be omitted from the electronic device 1101, or one or more other components may be added in the electronic device 1101. In some embodiments, some of the components (e.g., the sensor module 1176, the camera module 1180, or the antenna module 1197) may be implemented as a single component (e.g., the display module 1160).

The processor 1120 (e.g., the one or more processors 101) may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 (e.g., the first memory 102) may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 (e.g., a server having the remote storage 103) coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of generating or updating a texture atlas, the method comprising:
   obtaining a first texture to be stored in a texture atlas;
   dividing the first texture into a plurality of parts;
   storing the plurality of parts in a respective plurality of spaces in the texture atlas, such that the plurality of parts of the first texture may be separated by parts of other textures in the texture atlas; and
   storing texture reconstruction information defining how to combine the plurality of parts to render the first texture,
   wherein the storing of the plurality of parts in the texture atlas comprises:
      comparing the plurality of parts to each other to identify a plurality of repeated parts among the plurality of parts, the repeated parts comprising parts of the first texture which contain similar or identical image content to each other, and
      based on the plurality of repeated parts being identified, storing only one of the repeated parts in the texture atlas.

2. The method of claim 1, wherein the dividing of the first texture into the plurality of parts comprises dividing the first texture into a plurality of parts of equal size.

3. The method of claim 2,
wherein each of the plurality of parts of equal size has a width of n texture elements (texels) and a height of m texels, and
wherein, based on a width or a height of the first texture being a non-integer multiple of n or m, respectively, such that the first texture cannot be divided equally into the plurality of parts of equal size without leaving one or more remainder parts of smaller size than n×m, the method further comprising:
using padding to increase a size of each of the one or more remainder parts to n×m texels, so as to obtain the plurality of parts of equal size including the one or more padded remainder parts.

4. The method of claim 3, further comprising:
copying the plurality of parts of equal size including the one or more padded remainder parts into a memory block by using a linear memory copy operation.

5. The method of claim 1, wherein one or more of the first texture or the other textures in the texture atlas include textures of different sizes, and the plurality of parts of the first texture and the parts of the other textures are all a same size.

6. The method of claim 1,
wherein the texture atlas comprises an existing texture atlas stored in memory before the first texture is obtained, and
wherein the storing of the plurality of parts comprises updating the existing texture atlas by:
identifying a plurality of available spaces in the texture atlas, and
storing each of the plurality of parts in a respective one of the identified plurality of available spaces.

7. The method of claim 6, wherein the plurality of identified available spaces include one or more spaces occupied by a part of a texture that is no longer required, such that the part is replaced by a respective part of the first texture based on the plurality of parts of the first texture being stored in the texture atlas.

8. The method of claim 1, wherein the first texture comprises a texture for rendering a graphical user interface (GUI).

9. The method of claim 8, wherein the storing of the plurality of parts of the first texture comprises:
determining a drawing order in which the first texture and one or more other textures will be drawn when rendering the GUI, and
arranging the plurality of parts of the first texture and parts of the one or more other textures in the texture atlas according to the determined drawing order.

10. The method of claim 9,
wherein the texture atlas comprises a plurality of pages, and
wherein the plurality of parts of the first texture and parts of the one or more other textures are arranged among the plurality of pages according to the determined drawing order such that parts of textures which will be drawn at similar times are stored on a same page of the texture atlas, to reduce a number of drawing calls required when rendering the GUI.

11. The method of claim 9, further comprising:
determining that the drawing order has changed since the plurality of parts of the first texture and parts of the one or more other textures were arranged in the texture atlas; and
re-arranging the plurality of parts of the first texture and parts of the one or more other textures according to the changed drawing order.

12. The method of claim 9,
wherein the GUI screen comprises a scrollable GUI screen such that a first off-screen texture closer to an edge of the GUI screen in a scrolling direction will be drawn before a second off-screen texture further from the edge of the GUI screen, and
wherein the
determining of the drawing order comprises assigning the first off-screen texture a higher position in the drawing order than a position of the second off-screen texture.

13. The method of claim 1, further comprising:
compressing the texture atlas after storing the plurality of parts of the first texture,
wherein the plurality of parts of the first texture and the parts of the other textures are arranged to increase an efficiency of the compression.

14. The method of claim 13, further comprising:
arranging the plurality of parts of the first texture and the parts of the other textures to increase the efficiency of the compression comprises grouping parts with similar texture element (texel) values together in the texture atlas.

15. A non-transitory computer-readable recording medium having recorded thereon at least one program comprising instructions which, when executed by a computer, performs the method of claim 1.

16. An apparatus comprising:
one or more processors; and
a memory coupled to the one or more processors,
wherein the memory is configured to store computer program instructions, which, when executed by the one or more processors, cause the apparatus to:
obtain a first texture to be stored in a texture atlas,
divide the first texture into a plurality of parts,
store the plurality of parts in a respective plurality of spaces in the texture atlas, such that the plurality of parts of the first texture may be separated by parts of other textures in the texture atlas,
store texture reconstruction information defining how to combine the plurality of parts to render the first texture,
compare the plurality of parts to each other to identify a plurality of repeated parts among the plurality of parts, the repeated parts comprising parts of the first texture which contain similar or identical image content to each other, and
based on the plurality of repeated parts being identified, store only one of the repeated parts in the texture atlas.

17. The apparatus of claim 16, wherein the texture atlas and the texture reconstruction information are stored in at least one of the memory or a remote storage.

18. The apparatus of claim 16, wherein the computer program instructions, when executed by the one or more processors, further cause the apparatus to:
add one or more parts of a second texture to the texture atlas.

19. The apparatus of claim 18, wherein the computer program instructions, when executed by the one or more processors, further cause the apparatus to:
  rearrange parts of texture atlas to increase compression efficiency, and
  compress the texture atlas.

\* \* \* \* \*